(12) United States Patent
Gasworth

(10) Patent No.: US 10,107,948 B2
(45) Date of Patent: Oct. 23, 2018

(54) METHOD AND ARTICLE FOR EMITTING RADIATION FROM A SURFACE

(71) Applicant: SABIC GLOBAL TECHNOLOGIES B.V., Bergen op Zoom (NL)

(72) Inventor: Steven Marc Gasworth, Wixom, MI (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/526,782

(22) PCT Filed: Nov. 25, 2015

(86) PCT No.: PCT/IB2015/059109
§ 371 (c)(1),
(2) Date: May 15, 2017

(87) PCT Pub. No.: WO2016/084009
PCT Pub. Date: Jun. 2, 2016

(65) Prior Publication Data
US 2017/0357042 A1    Dec. 14, 2017

Related U.S. Application Data

(60) Provisional application No. 62/084,061, filed on Nov. 25, 2014.

(51) Int. Cl.
*F21V 8/00* (2006.01)
*C09K 11/06* (2006.01)
(Continued)

(52) U.S. Cl.
CPC ............ *G02B 6/0003* (2013.01); *C09K 11/06* (2013.01); *C09K 11/08* (2013.01); *C25B 1/003* (2013.01); *G02B 6/0031* (2013.01)

(58) Field of Classification Search
CPC .............. F21Y 2115/10; F21Y 2105/00; F21V 3/0481; F21V 7/22; F21V 9/08; G02B 6/005
(Continued)

(56) References Cited

U.S. PATENT DOCUMENTS 2,515,584 A   7/1950   Benson
2,795,069 A   6/1957   Hardesty
(Continued)

FOREIGN PATENT DOCUMENTS

CN   1536411 A   10/2004
CN   1979267 A   6/2007
(Continued)

OTHER PUBLICATIONS

Nieman et al, "An Apertureless Near-field Scanning Optical Microscope and its Application to Surface-enhanced Raman Spectroscopy and Multiphoton Fluorescence Imaging", Review of Scientific Instruments, 2001, pp. 1691-1699, vol. 72, Third Edition.
(Continued)

*Primary Examiner* — William Carter
(74) *Attorney, Agent, or Firm* — Cantor Colburn LLP

(57) ABSTRACT

In an embodiment, a radiation emitting device comprises a radiation emitting layer comprising a host material and a luminescent agent; and a radiation source that emits a source radiation; wherein the radiation emitting layer comprises an edge and two broad surfaces, wherein the edge has a height of d and the broad surfaces have a length L, wherein length L is greater than height d, and the ratio of L to d is greater than or equal to 10; and wherein the radiation source is coupled to the edge, wherein the source radiation is transmitted from the radiation source through the edge and excites the luminescent agent, whereafter the luminescent agent emits an emitted radiation, wherein at least a portion
(Continued)

of the emitted radiation exits through at least one of the broad surfaces through an escape cone.

18 Claims, 7 Drawing Sheets

(51) Int. Cl.
    *C09K 11/08* (2006.01)
    *C25B 1/00* (2006.01)
(58) Field of Classification Search
    USPC .................................................. 362/600–634
    See application file for complete search history.

(56) References Cited

U.S. PATENT DOCUMENTS

| | | | |
|---|---|---|---|
| 2,886,911 | A | 5/1959 | Hardesty |
| 3,506,325 | A | 4/1970 | Horvay |
| 3,962,702 | A | 6/1976 | Kriege |
| 5,165,187 | A | 11/1992 | Shahidi-Hamedani et al. |
| 5,408,572 | A | 4/1995 | Kriege |
| 5,712,332 | A | 1/1998 | Kaieda et al. |
| 5,816,238 | A | 10/1998 | Burns et al. |
| 5,951,920 | A | 9/1999 | Schuman et al. |
| 6,051,194 | A | 4/2000 | Peill et al. |
| 6,139,803 | A | 10/2000 | Watanabe et al. |
| 6,205,282 | B1 | 3/2001 | Gaydoul |
| 6,272,265 | B1 | 8/2001 | Franklin |
| 6,319,613 | B1 | 11/2001 | Takeda et al. |
| 7,052,161 | B2 | 5/2006 | Lichtenstein et al. |
| 7,194,158 | B2 | 3/2007 | Schultheis et al. |
| 7,338,180 | B2 | 3/2008 | Wing |
| 7,434,951 | B2 | 10/2008 | Bienick |
| 7,572,486 | B2 | 8/2009 | Takahashi et al. |
| 7,764,421 | B2 | 7/2010 | Fujiwara et al. |
| 8,236,383 | B2 | 8/2012 | Gasworth et al. |
| 8,292,458 | B2 | 10/2012 | Bertram et al. |
| 9,001,288 | B2 | 4/2015 | Tsukara et al. |
| 2003/0022967 | A1 | 1/2003 | Dobler et al. |
| 2004/0028920 | A1 | 2/2004 | Fujita et al. |
| 2004/0131845 | A1 | 7/2004 | Fujita |
| 2004/0153215 | A1 | 8/2004 | Kearney et al. |
| 2004/0191485 | A1 | 9/2004 | Groothues et al. |
| 2005/0095433 | A1 | 5/2005 | Bogerd et al. |
| 2006/0001036 | A1 | 1/2006 | Jacob et al. |
| 2006/0209551 | A1 | 9/2006 | Schwenke et al. |
| 2007/0221865 | A1* | 9/2007 | Sohn .................. C09K 11/7731 250/484.4 |
| 2008/0050579 | A1 | 2/2008 | Kirkman et al. |
| 2010/0068532 | A1 | 3/2010 | Fisher |
| 2012/0064134 | A1 | 3/2012 | Bourke, Jr. et al. |
| 2012/0132930 | A1* | 5/2012 | Young .................. H01L 31/0481 257/84 |
| 2014/0119052 | A1 | 5/2014 | Hayama |
| 2014/0153215 | A1 | 6/2014 | Hayama |

FOREIGN PATENT DOCUMENTS

| | | |
|---|---|---|
| DE | 10110142 B4 | 6/2005 |
| EP | 0334799 A2 | 9/1989 |
| EP | 0579835 A1 | 5/1993 |
| EP | 0732049 B1 | 5/1998 |
| GB | 2333829 A | 8/1999 |
| JP | S5911934 A | 1/1984 |
| JP | 62195882 A | 8/1987 |
| JP | H03227366 A | 10/1991 |
| JP | H11321304 A | 11/1999 |
| JP | 2000096034 | 4/2000 |
| JP | 2000178428 | 6/2000 |
| JP | 2002138271 | 5/2002 |
| JP | 2002194291 | 7/2002 |
| JP | 2003105186 | 4/2003 |
| JP | 2003201155 | 7/2003 |
| JP | 2004355961 | 12/2004 |
| JP | 2005047179 | 2/2005 |
| JP | 2005337698 A | 12/2005 |
| JP | 2013001611 A | 1/2013 |
| WO | 2004037620 A1 | 5/2004 |
| WO | 2004044481 A1 | 5/2004 |
| WO | 2005003047 A1 | 1/2005 |
| WO | 2006088370 A2 | 8/2006 |
| WO | 2016084008 A1 | 6/2016 |

OTHER PUBLICATIONS

Althues et al.; "Functional inorganic nanofillers for transparent polymers"; Chemical Society Reviews; (2007); 36; pp. 1454-1465.
Binnemans; "Lanthanide-Based Luminescent Hybrid Materials"; Chem. Rev. (2009); 109; pp. 4283-4374.
Earp et al.; "Maximising the light output of a Luminescent Solar Concentrator"; Solar Energy 76 (2004) pp. 655-667.
Fischer et al.; "Asymmetric PPCys: Strongly fluorescing NIR labels"; Chem. Commun.; (2010); 46; pp. 5289-5291.
Fischer et al.; "Near-Infrared Dyes and Fluorophores Based on Diketopyrrolopyrroles"; Angew. Chem. Int. Ed.; (2007); 46; pp. 3750-3753.
Fischer et al.; "Pyrrolopyrrol Cyanine (PPCy) dyes: A new class of near-infrared dyes and fluorophores"; Chemistry A European Journal; Supporting Information; (2009); 15 pages.
Fischer et al.; "Pyrrolopyrrole Cyanine Dyes: A New Class of Near-Infrared Dyes and Fluorophores"; Chem. Eur. J.; (2009); 15; pp. 4857-4864.
Fischer et al.; "Selective NIR chromophores: Bis(Pyrrolopyrrole) Cyanines"; Angew. Chem. Int. Ed.; (2011); 50; pp. 1406-1409.
Fischer et al.; "Selective NIR chromophores: Bis(Pyrrolopyrrole) Cyanines"; Angewandte Chemi; Supporting Information (2011); 26 pages.
Gnaser et al.; "Nanocrystailine TiO2 for Photocatalysis"; Encyclopedia of Nanoscience and Nanotechnology; vol. 6 (2004); pp. 505-535.
Groh et al.; "What is the Lowest Refractive Index of an Organix Polymer?"; Macromolecules (1991); 24; pp. 6660-6663.
Hale et al.; "Optical Constants of Water in the 200-nm to 200-um Wavelength Region"; Applied Optics; vol. 12; No. 3; (Mar. 1973); pp. 555-563.
International Search Report for International Application No. PCT/IB2015/059109; International Filing Date Nov. 25, 2015; dated Mar. 31, 2016; 5 pages.
IPRP, Mailed Feb. 14, 2017, P230050PCT.
Kalyani et al.; "Organic light emitting diodes: Energy saving lighting technology—A review"; Renewable and Sustainable Energy Review 16; (2012); pp. 2696-2723.
Koole et al.; "On the Incorporation echanism of Hydrophobic Quantum Dots in Silica Spheres by a Reverse Microemulsion Method"; Chem. Mater. (2008) 20; pp. 2503-2512.
Liou et al.; "Flexible Nanocrystalline-Titania/Polyimide Hybrids with High Refractive Index and Excellent Thermal Dimensional Stability"; J. Polymer Science: Part A: Polymer Chemistry; vol. 48; pp. 1433-1441; (2010).
Liu et al.; "High refractive index polymers: fundamental research and practical applications"; J. Materials Chemistry; (2009); 19; pp. 8907-8919.
Mayerhoffer et al.; "Synthesis and Molecular Properties of Acceptor-Substituted Squaraine Dyes"; Chem. Eur. J.; (2013); 19; pp. 218-232.
Melby et al.; "Synthesis and Fluorescence of Trivalent Lanthanide Complexes"; J. Amer Chem. Soc.; 86; (1964); pp. 5117-5125.
Mills et al.; "A web-based overview of semiconductor photochemistry-based current commercial applications"; Journal of Photochemistry and Photobiology A: Chemistry 152 (2002); pp. 233-247.
Mills et al.; "Simultaneous monitoring of the destruction of stearic acid and generation of carbon dioxide by self-cleaning semiconductor photocatalytic films"; Jrnl. of Photochemistry and Photobiology A: Chemistry 182 (2006); pp. 181-186.
Nakane et al.; "Properties of poly(vinyl butyral)/TiO2 nanocomposites formed by sol-gel process"; Composites Part B 35; (2004); pp. 219-222.

(56) References Cited

OTHER PUBLICATIONS

Olson et al.; "Luminescent solar concentrators and the reabsorption problem"; Applied Optics; vol. 20; No. 17 (Sep. 1981); pp. 2934-2940.

Palladino; "Supercar company McLaren wants to do away with old-school windshield wipers for good"; http://www.theverge.com/2013/12/17/5220842/mclaren-windshield-wiper-technology; Dec. 17, 2013; 18 pages.

Peill et al.; "Chemical and Physical Characterization of a $TiO_2$-Coated Fiber Optic Cable Reactor"; Environ. Sci. Technol, 30 (1996); pp. 2806-2812.

Roberts et al.; "Efficient excitation energy transfer among multiple dyes in polystyrene microspheres"; Journal of Luminescence 79 (1998) pp. 225-231.

Romanelli et al.; "Intense Near-IR Emissin from Nanoscale Lanthanoid Fluoride clusters"; Angew. Chem. Int. Ed.; (2008); 47; pp. 6049-6051.

Sun et al.; "$TiO_2$-coated optical fiber bundles used as a photocatalytic filter for decomposition of gaseous organic compounds"; Journal of Photochemistry and Photobiology A: Chemistry 136 (2000); pp. 111-116.

Wang et al.; "Europium complex doped luminescent solar concentrators with extended absorption range from UV to visible region"; Solar Energy 85; (2011); pp. 2179-2184.

Wang et al.; "Large-Scale Solvent-Free Chlorination of Hydroxy-Pyrimidines; -Pyridines, -Pyrazines and -Amides Using Equimolar $POCl_3$"; Molecules 2012; 17; pp. 4533-4544.

Wang et al.; "Recent advances in the chemistry of lanthanide-doped upconversion nanocrystals"; Chem. Soc. Rev.; (2009); 38; pp. 976-989.

Warren et al.; "Optical constants of ice from the ultraviolet to the microwave: A revised compilation"; Journal of Geophysical Research; vol. 113; D14220; (2008); 10 pages.

Wenger et al.; "Chemical Tuning of the Photon Upconversion Properties in $Ti^{2+}$-Doped Chloride Host Lattices"; Inorg. Chem. (2001); 40; pp. 5747-5753.

Wiktorowski et al.; "Photophysics of aminophenyl substituted pyrrolopyrrole cyanines"; Phys. Chem. Chem. Phys.; (2012); 14; pp. 2921-2928.

Written Opinion of the International Search Report for International Application No. PCT/IB2015/059109; International Filing Date Nov. 25, 2015; dated Mar. 31, 2016; 5 pages.

Xu et al.; "Photocatalytic activity on $TiO_2$-coated side-glowing optical fiber reactor under solar light"; J. Photochemistry and Photobiology A: Chemistry 199 (2008); pp. 165-169.

You et al.; "Synthesis of Highly Refractive and Transparent Polyimides Derived from 4,4'-Thiobis[2",6"-dimethyl-4"-(p-phenylenesulfanyl)aniline]"; J. Polymer Science Part A: Polymer Chemistry; vol. 48; pp. 656-662 (2010).

Yuwono et al.; "Controlling the crystallinity and nonlinear optical properties of transparent $TiO_2$-PMMA nanohybrids"; J. Materials Chemistry; (2004); 14; pp. 2978-2987.

Zimmermann et al.; "Polymer Nanocomposites with "Ultralow" Refractive Index"; Polymers for Advanced Technologies; vol. 4; pp. 1-7; 1993.

* cited by examiner

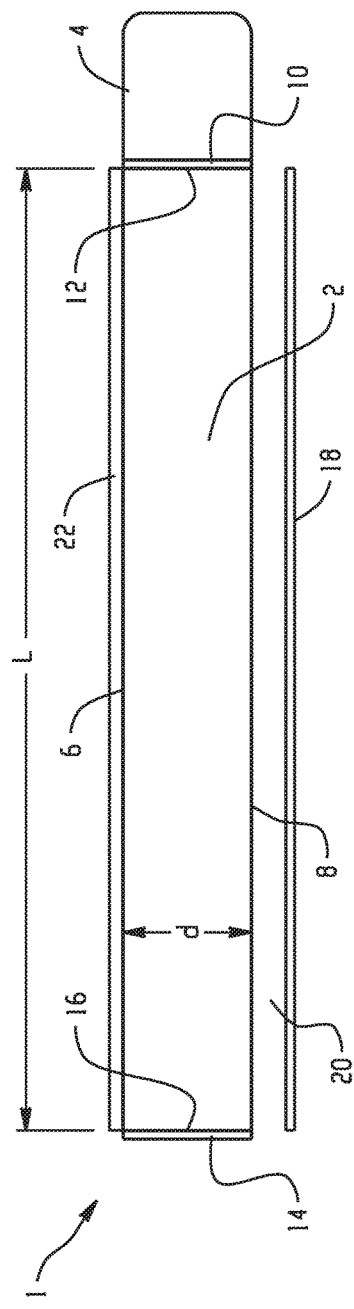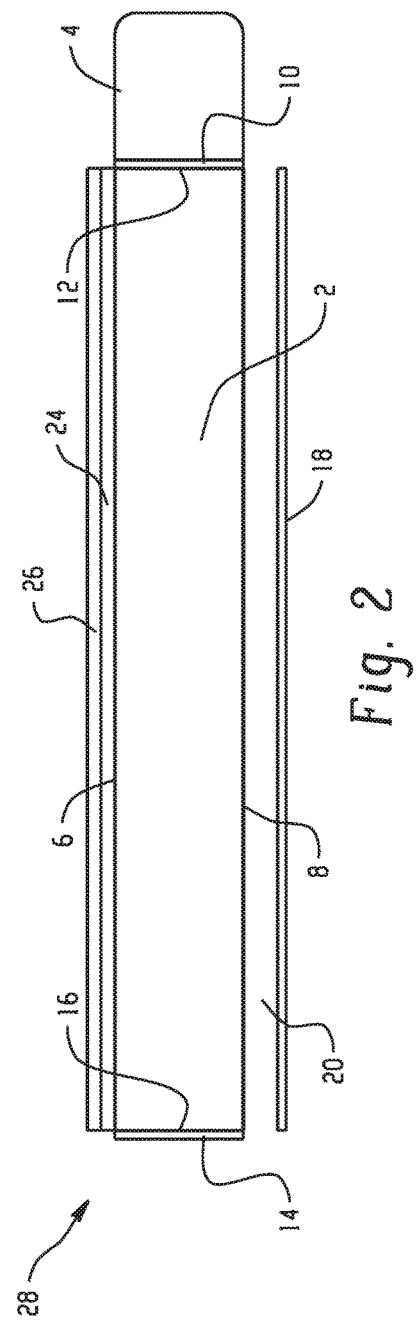

METHOD AND ARTICLE FOR EMITTING RADIATION FROM A SURFACE

CROSS REFERENCE TO RELATED APPLICATIONS

This application is a National Stage application of PCT/IB2015/059109, filed Nov. 25, 2015, which claims the benefit of U.S. Provisional Application No. 62/084,061, filed Nov. 25, 2014, both of which are incorporated by reference in their entirety herein.

BACKGROUND

Radiating devices have been developed for applications such as defrosting, defogging, and/or deicing a surface; illumination; and for self-cleaning surfaces. These devices suffer from one or more of an obstructed view through the device, opacity, insufficiently uniform intensity of the emitted radiation, insufficient intensity of emitted radiation far from the perimeter of the device, and low efficiency. A radiation emitting device that is able to overcome one or more of these drawbacks is desirable.

BRIEF DESCRIPTION

Disclosed herein is a radiation emitting device and a method of emitting radiation therefrom.

In an embodiment, a radiation emitting device comprises a radiation emitting layer comprising a host material and a luminescent agent; and a radiation source that emits a source radiation; wherein the radiation emitting layer comprises an edge and two broad surfaces, wherein the edge has a height of d and the broad surfaces have a length L, wherein length L is greater than height d, and the ratio of the length L to the height d is greater than or equal to 10; and wherein the radiation source is coupled to the edge, wherein the source radiation is transmitted from the radiation source through the edge and excites the luminescent agent, whereafter the luminescent agent emits an emitted radiation, wherein at least a portion of the emitted radiation exits through at least one of the broad surfaces through an escape cone.

In another embodiment, a method for emitting radiation from a surface comprises emitting a source radiation from a radiation source; illuminating a radiation emitting layer comprising a host material and a luminescent agent with the radiation, wherein the radiation emitting layer comprises an edge, a first broad surface, and a second broad surface; wherein the radiation source is coupled to the edge, wherein the source radiation is transmitted from the radiation source through the edge and excites the luminescent agent, whereafter the luminescent agent emits an emitted radiation, wherein at least a portion of the emitted radiation exits through at least one of the broad surfaces through an escape cone.

The above described and other features are exemplified by the following figures and detailed description.

BRIEF DESCRIPTION OF THE DRAWINGS

Refer now to the figures, which are exemplary embodiments, and wherein the like elements are numbered alike.

FIG. 1 is a cross-sectional side view of a radiation emitting device;

FIG. 2 is a cross-sectional side view of a radiation emitting device for photo-catalytic applications;

In FIGS. 3-8, Em refers to the emission spectrum of the luminescent agent of the number listed thereafter, Ex refers to the excitation spectrum of the luminescent agent of the number listed thereafter, and S refers to the spectrum of a source, where if there is a number listed thereafter, the number refers to, for example, the first or second source. For example, Ex1 refers to the excitation spectrum of the first luminescent agent, LA1. The peaks of the spectra are indicated by vertical broken lines.

DETAILED DESCRIPTION

Figure 3:
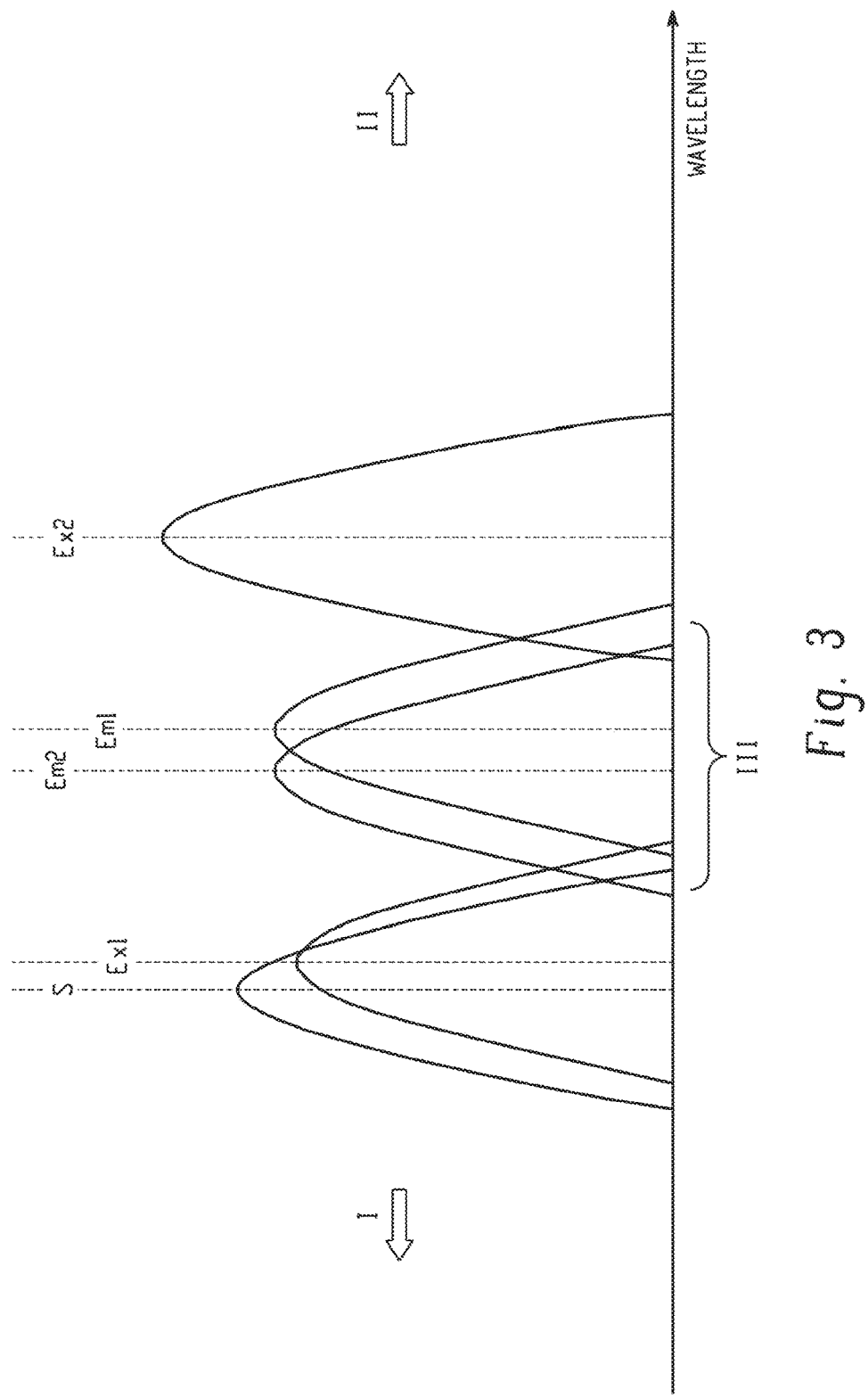
FIG. 3 is a graphical representation of excitation and emission spectra for two luminescent agents where the source spectrum overlaps with the excitation spectrum of a downshifting agent.

Radiating devices have been developed such that they comprise two broad surfaces with narrow edges where radiation is emitted from a source disposed opposite of one of the broad surfaces or from a source disposed at an edge. The location of the radiation source opposite of one of the broad surfaces disadvantageously results in an obstructed view through the device. The location of the radiation source located at an edge results in problems with emission decay with distance from the radiation source.

In order to overcome these and other drawbacks, the inventors hereof developed a radiation emitting device comprising a radiation source and a radiation emitting layer comprising a host and a luminescent agent, wherein the radiation source is coupled to an edge of the radiation emitting layer. The radiation emitting device is able to achieve one or more of the following: 1) uniform radiation emission over one or both of the broad surfaces of the radiation emitting layer without requiring, for example, gradients in the active agents; 2) melting, defrosting, or defogging, for example, of water and/or ice located on a broad surface of the radiation emitting layer such that action is not inhibited by a low thermal conductivity of the host material or delayed by a need to first heat up the article; 3) the radiation can be emitted from both of the broad surfaces of the radiation emitting layer; and 4) when a material (such as water or ice) with a higher refractive index than air is present on a broad surface, the escape cone of the emitted radiation can be broadened such that roughly double, as an example, the fraction of photons can be emitted in the location of the higher refractive index material. As used herein, uniform radiation emission refers to the measured radiation at all locations on a broad surface being within 40%, specifically, 30%, more specifically, 20% of the average radiation being emitted from the broad surface.

The radiation emitting device can comprise a radiation emitting layer that comprises a host material and at least one luminescent agent. The radiation emitting layer can have two broad, coextensive surfaces with a length L that are bounded by short edges with a height d, as illustrated in FIG. 1. The ratio of L to d can be greater than or equal to 10, specifically, greater than or equal to 30, more specifically, 30 to 10,000, and still more specifically, 30 to 500.

The radiation emitting layer can be flat, for example, if the device will be used as a shelf, or curved, for example, if the device will be used as a lens. The distance between a first surface and a second surface of the radiation emitting layer can be constant or can vary at different locations in the device. The surfaces can be smooth surfaces such that they support light guiding by total internal reflection. Likewise, one or both surfaces can be textured, for example, for beam diffusion in lighting applications, where the texturing can act selectively on visible wavelengths while sustaining total internal reflection for longer wavelengths through the device.

Referring now to the figures, FIG. 1 illustrates radiation emitting device 1 comprising radiation emitting layer 2 and radiation source 4. Coating 22 has been applied to first surface 6. Selectively reflecting mirror 10 is located on source edge 12 in between radiation source 4 and radiation emitting layer 2 and edge mirror 14 is located on edge 16. Surface mirror 18 is located proximal to second surface 8 such that there is gap 20 located there between.

FIG. 2 illustrates a photo-catalytic radiation emitting device 28 comprising radiation emitting layer 2 and radiation source 4. Photo-catalytic layer 26 is located proximal to first surface 6 with an optional interlayer 24 located there between. Selectively reflecting mirror 10 is located on source edge 12 in between radiation source 4 and radiation emitting layer 2 and edge mirror 14 is located on edge 16. Surface mirror 18 is located proximal to second surface 8 such that there is gap 20 located there between. While FIG. 2 illustrates that the photo-catalytic layer and interlayer are present on only one side of the device, it is understood that a photo-catalytic layer can be present on both surfaces 6 and 8 with an optional interlayer 24 located between the surfaces and the photo-catalytic layers.

The radiation emitting layer comprises a host material and a luminescent agent and can further comprise an ultraviolet light (UV) absorber. The luminescent agent can be dispersed throughout the host material or can be localized to one or more sub-layers in the radiation emitting layer. For example, the radiation emitting layer can comprise a first radiation emitting sub-layer and a second radiation emitting sub-layer, wherein each of the radiation emitting sub-layers independently can comprise a luminescent agent. Likewise, the sub-layers can comprise the same or different luminescent agent and can comprise the same or different host material. When the radiation emitting layer comprises two or more sub-layers and one of the sub-layers is an in-mold coating, one or more of the luminescent agents can be located in said in-mold coating and can allow for more mild processing conditions for the luminescent agent. In other words, the radiation emitting layer can be an in-mold coating layer.

The radiation emitting layer can be transparent such that the material has a transmittance of greater than or equal to 80%. The radiation emitting layer can be transparent such that the material has a transmittance of greater than or equal to 90%. The radiation emitting layer can be transparent such that the material has a transmittance of greater than or equal to 95%. Transparency can be determined by using 3.2 mm thick samples using ASTM D1003-00, Procedure B using CIE standard illuminant C, with unidirectional viewing.

The host material can comprise a material such as a polycarbonate (such as a bisphenol A polycarbonate), a polyester (such as poly(ethylene terephthalate) and poly (butyl terephthalate)), a polyarylate, a phenoxy resin, a polyamide, a polysiloxane (such as poly(dimethyl siloxane)), a polyacrylic (such as a polyalkylmethacylate (such as poly(methyl methacrylate)) and polymethacrylate), a polyimide, a vinyl polymer, an ethylene-vinyl acetate copolymer, a vinyl chloride-vinyl acetate copolymer, a polyurethane, or copolymers and/or blends comprising one or more of the foregoing. The host material can comprise polyvinyl chloride, polyethylene, polypropylene, polyvinyl alcohol, poly vinyl acrylate, poly vinyl methacrylate, polyvinylidene chloride, polyacrylonitrile, polybutadiene, polystyrene, polyvinyl butyral, polyvinyl formal, or copolymers and/or blends comprising one or more of the foregoing. The host material can comprise polyvinyl butyral, polyimide, polycarbonate, or a combination comprising one or more of the foregoing. When the radiation emitting layer comprises polycarbonate, the polycarbonate can comprise an IR absorbing polycarbonate. The host material can comprise a combination comprising one or more of the foregoing materials.

The radiation emitting layer comprises a luminescent agent, where the luminescent agent can comprise greater than or equal to 1 luminescent agent, specifically, greater than or equal to 2 luminescent agents, more specifically, 2 to 6 luminescent agents, even more specifically, 2 to 4 luminescent agents.

Luminescent agents have been used in luminescent solar concentrators (LSC), for example, in solar panels that function to absorb light from the sun. In an LSC, light is transmitted into the device through a broad surface of the device, where it is absorbed by a luminescent agent and is emitted at a different wavelength. A portion of the emitted light is transmitted by total internal reflection to an edge of the device where it is transmitted to an edge-coupled element such as a photovoltaic cell. For LSCs, a maximum collection of incident solar radiation is promoted by the following condition on the absorption coefficient at excitation wavelengths of the luminescent agent, $A_{ex/LSC}$:

$$A_{ex/LSC} > 1/D \tag{1}$$

where D is the thickness of the LSC device. Reabsorption during light transport along the LSC to the edge-coupled element is minimized by the following condition on the absorption coefficient at emission wavelengths of the luminescent agent, $A_{em/LSC}$:

$$A_{em/LSC} \ll 1/m \tag{2}$$

where m is the length of the device.

In contrast, for example, in the present radiation emitting devices, reabsorption by the luminescent agent in the escape cone is largely avoided with the following conditions on concentration-dependent absorption coefficients at the emission wavelengths of a first and second luminescent agents, $A_{em1}$ and $A_{em2}$, respectively, where it is noted that the second luminescent agent does not need to be present:

$$A_{em1} \leq 1/d \tag{3a}$$

$$A_{em2} \leq 1/d \tag{3b}$$

where d is the thickness of the radiation emitting layer (see FIG. 1).

FIG. 3 illustrates that source spectrum S can overlap with excitation spectrum Ex1 of a downshifting first luminescent agent LA1. Distribution of source light over the length of the device is promoted by the following condition on the concentration-dependent absorption coefficient at the excitation wavelengths of the first luminescent agent:

$$A_{ex1} \sim 1/L;\ 0.2/L \leq A_{ex1} \leq 5/L \qquad (4a)$$

where L is the length of the device measured from the edge-coupled source, where if a second edge-coupled source were disposed on an edge opposite the first source then L would be replaced by L/2 in Equation 4a.

If a second luminescent agent is present, whose excitation spectrum does not overlap with the source spectrum S, then Equation 4b indicates that the second luminescent agent can be present in relatively high effective concentration and can thus more effectively recycle photons in the long wavelength tail of a first luminescent agent.

$$A_{ex2} \geq A_{ex1} \qquad (4b)$$

The presence of the second luminescent agent can therefore result in a more uniform radiation emission from the broad surface, for example, being within 40%, specifically, 30%, more specifically, 20% of the average radiation being emitted from the broad surface.

As used herein, the terms "first" and "second" with regards to the luminescent agents, the emission spectrum, and the excitation spectrum are used merely to distinguish two separate luminescent agents in the radiation emitting layer.

FIG. 3 shows the excitation and emission spectrum of a device that comprises a downshifting first luminescent agent LA1, where emission spectrum Em1 is shifted to longer wavelengths, where absorbed photons are converted to lower energy photons and an upshifting second luminescent agent LA2, where emission spectrum Em2 is shifted to shorter wavelengths, where absorbed photons are converted to higher energy photons. It is understood that upshifting encompasses up-conversion, whereby absorption of two photons at lower energy yields emission of one photon at higher energy. Source spectrum S overlaps with excitation spectrum Ex1 of the first luminescent agent LA1. This overlap results in the production of a first generation of photons with wavelengths represented by emission spectrum Em1 of the first luminescent agent LA1 that occurs over the length of the article owing to Equation 4a. A portion of those photons, for example, 20 to 30% can be emitted into the escape cone and will exit the article through at least one of the broad surfaces of the device, owing to Equations 3a and 3b. The remaining photons that were not emitted within the escape cone can be guided by total internal reflection within the article, where those reaching an edge can be reflected back into the article, for example, by an edge mirror. These remaining photons can then encounter a luminescent agent, either a first luminescent agent LA1 or a second luminescent agent LA2. As the emission spectrum Em1 overlaps with excitation spectrum Ex1 and excitation spectrum Ex2, LA1 and LA2 can be excited producing a second generation of photons with wavelengths as illustrated by emissions spectrum Em1 and emission spectrum Em2. This second generation of emitted photons further contributes to photon emission from the surface of the device through the escape cone, with the balance of the photons being recycled as with the first generation. Accordingly, further generations of photons are likewise produced.

Figure 4:
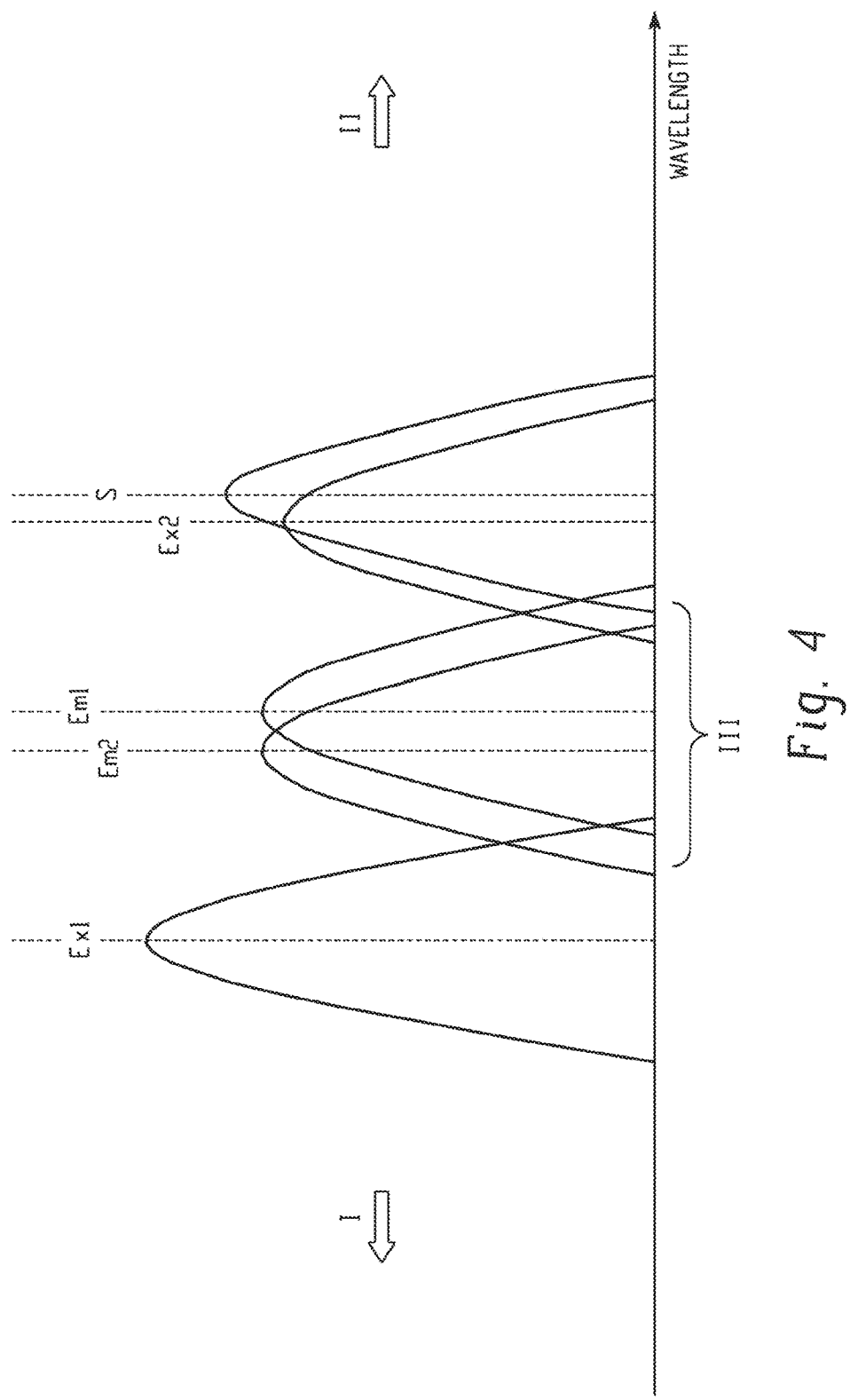
FIG. 4 is a graphical representation of excitation and emission spectra for two luminescent agents where the source spectrum overlaps with the excitation spectrum of an upshifting agent.

FIG. 4 illustrates that source spectrum S can instead overlap with excitation spectrum Ex2 of an upshifting second luminescent agent LA2. The conditions and operation are analogous to those as described for FIG. 3 except that Equation 4a is replaced by the following:

$$A_{ex2} \sim 1/L;\ 0.2/L \leq A_{ex2} \leq 5/L \qquad (5a)$$

If a further luminescent agent is present whose excitation spectrum does not overlap with the source spectrum S, then, similar to Equation 4b, Equation 5b indicates that the further luminescent agent can be present in relatively high effective concentration and can thus more effectively recycle photons in the long wavelength tail of a first luminescent agent.

$$A_{ex1} \geq A_{ex2} \qquad (5b)$$

In either case, Equation 4b and 5b indicate that the presence of LA2 and LA1, respectively, can result in a more uniform radiation emission from the broad surface, for example, being within 40%, specifically, 30%, more specifically, 20% of the average radiation being emitted from the broad surface.

The source can be chosen based on the relative concentration limits for the respective luminescent agents, for example, based on whether the absorption coefficient at the excitation wavelength of the first luminescent agent is less than that of the absorption coefficient at the excitation wavelength second luminescent agent (Equation 4b) or whether the absorption coefficient at the excitation wavelength of the first luminescent agent is greater than the absorption coefficient at the excitation wavelength of the second luminescent agent (Equation 5b). Alternatively, for example, with Em1 and Em2 in the near-IR, the source can be chosen based on a desire to either avoid long wavelength host absorption bands (e.g., FIG. 3) or to avoid visible bands (e.g., FIG. 4).

Regarding the LSC devices described above, Equations 3-5 differ significantly from Equations 1 and 2, further illustrating the novelty of the present radiation emitting device. Recognizing that $1/D \gg 1/m$, and assuming respective ranges of D and m common to an LSC are similar to d and L of the present article, Equations 1, 4, and 5 indicate that $A_{ex1}$ and/or $A_{ex2}$ can be much less than $A_{ex/LSC}$, so the optimum concentrations of the luminescent agent can be lower for the present device than for an LSC. Lower concentrations support avoidance of luminescent agent aggregation that can scatter light, which can reduce transparency, and/or quench luminescence, which can undermine efficiency.

Further regarding FIGS. 3 and 4, the luminescent agents can be chosen based on the application and their respective excitation spectra. For example, when the radiation emitting device is used for defogging, defrosting, and/or deicing, LA1 and LA2 can be chosen such that excitation spectrum Ex1 is greater than wavelengths I of the visible band, excitation spectrum Ex2 is less than the wavelengths II of the absorption bands of the host material, for example, less than those of polycarbonate, and emission spectra Em1 and Em2 have wavelengths in the desired emission band III, for example, of 800 to 1100 nanometers (nm) Likewise, when the radiation emitting device is used for photo-catalytic applications, LA1 and LA2 can be chosen such that excitation spectrum Ex1 is greater than wavelengths I that will potentially harm the host material, for example, polycarbonate, excitation spectrum Ex2 is less than the wavelengths II of the visible wavelength, and emission spectra Em1 and Em2 have wavelengths in the desired emission band III, for example, of 350 to 400 nanometers (nm).

Figure 5:
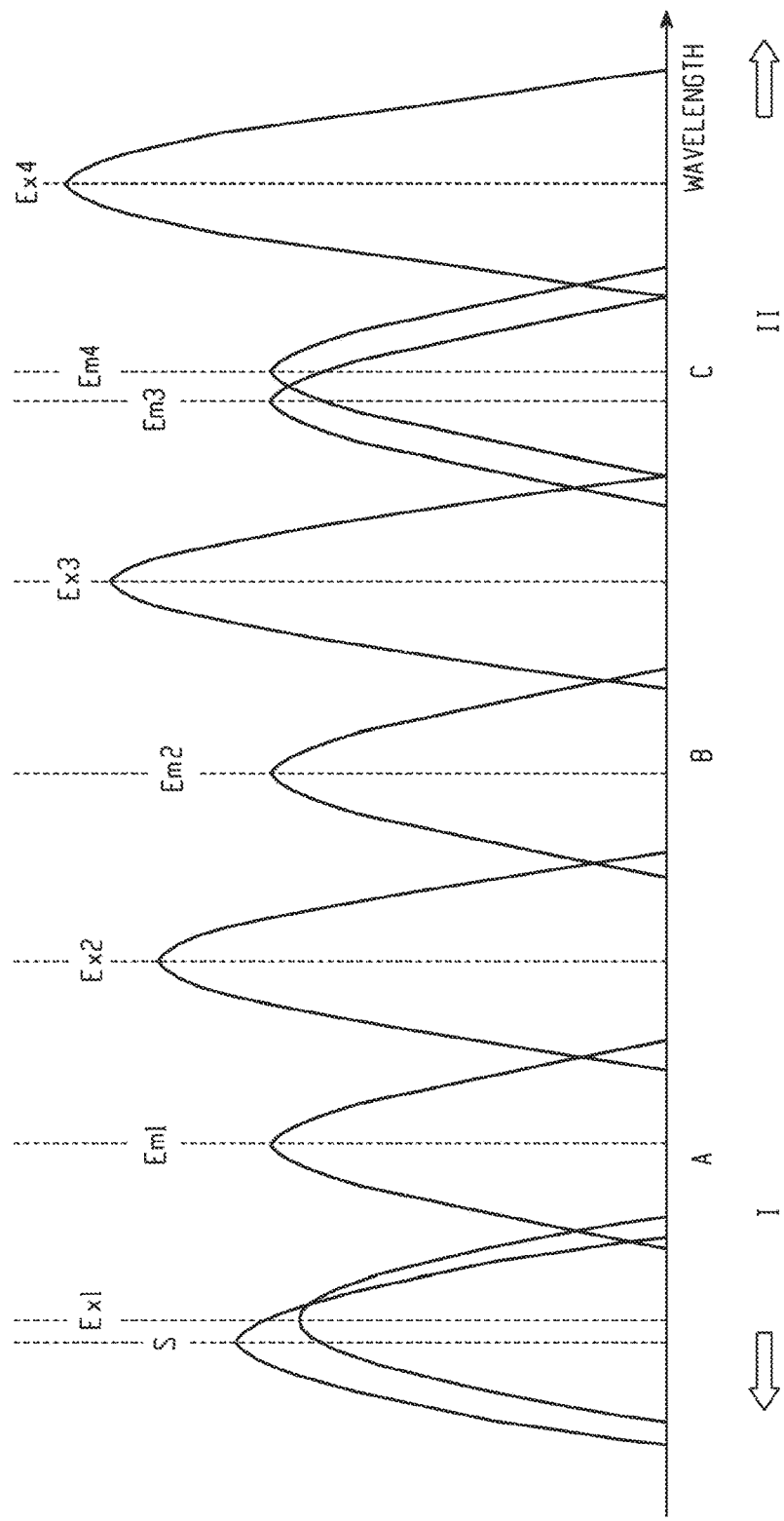
FIG. 5 is a graphical representation of excitation and emission spectra for four luminescent agents where the source spectrum overlaps with the excitation spectrum of a downshifting agent.
Figure 6:
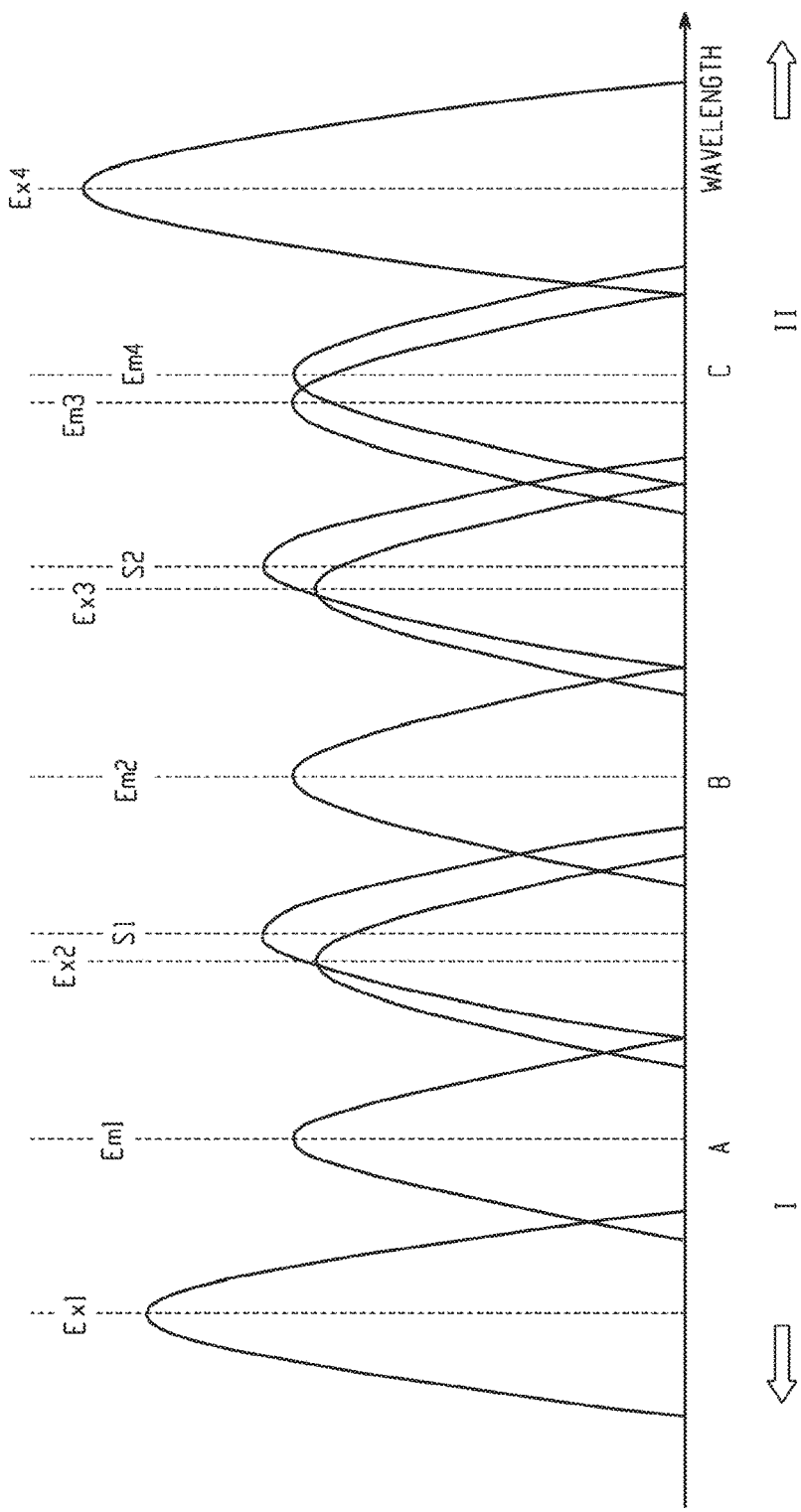
FIG. 6 is a graphical representation of excitation and emission spectra for four luminescent agents and two source spectra, where each of the source spectra overlaps with the excitation spectrum of a downshifting agent.
Figure 7:
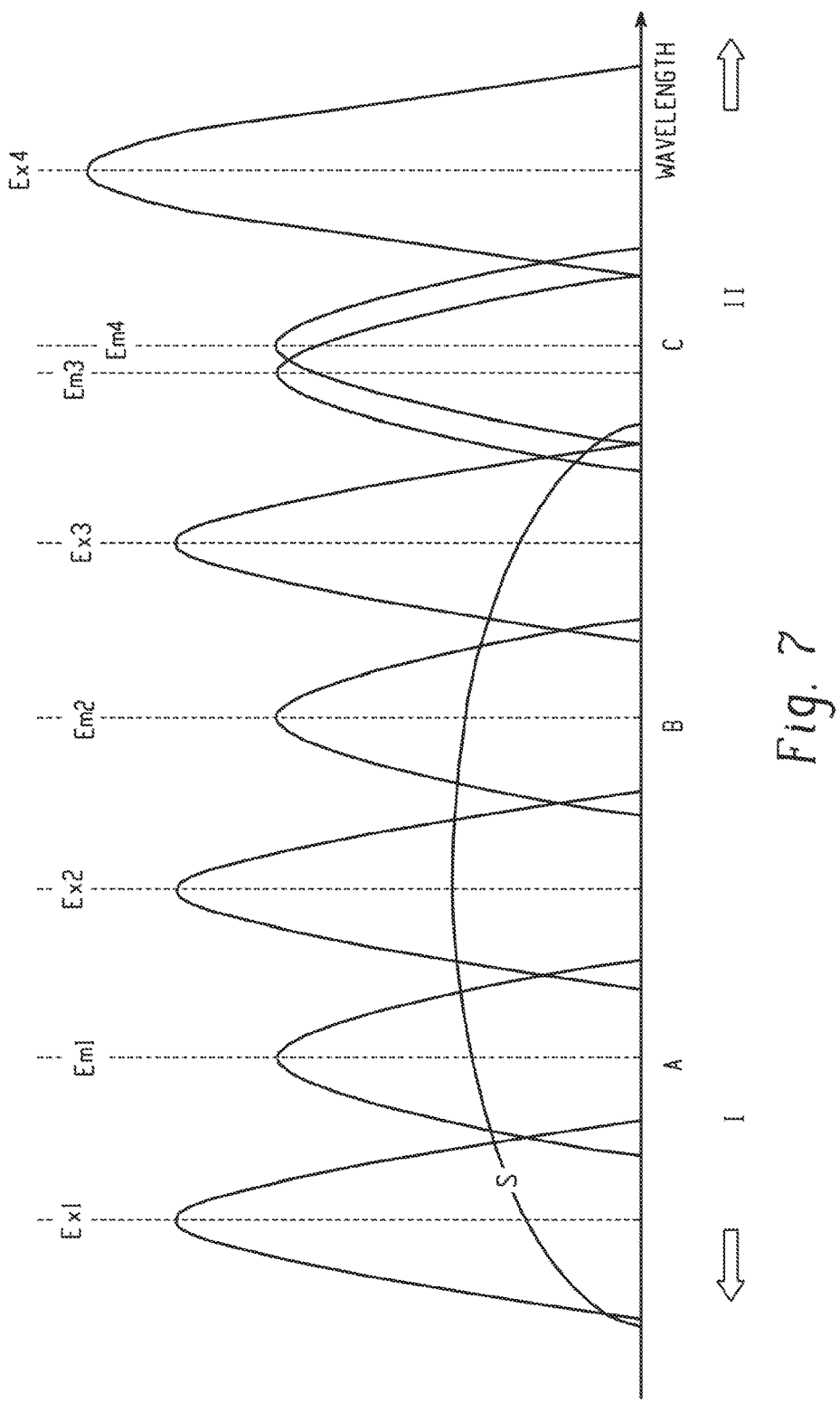
FIG. 7 is a graphical representation of excitation and emission spectra for four luminescent agents where the source spectrum overlaps with the excitation spectra of multiple agents.

It is understood that while FIGS. 3 and 4 describe situations where two luminescent agents are present, applications where one luminescent agent is present are analogous except that there is no excitation of a second agent. Likewise, more than two luminescent agents can be present, for example, as shown in FIGS. 5-7 when four different luminescent agents LA1, LA2, LA3, and LA4 are present. One skilled in the art understands that the relative amounts of the luminescent agents LA1, LA2, LA3, and LA4 can be adjusted, for example, to maintain conditions analogous to Equations 4 or 5.

FIG. 5 illustrates that the source can comprise a narrow band source spectrum S that overlaps, for example, with a single excitation spectrum. Specifically, FIG. 5 illustrates source spectrum S that overlaps with excitation spectrum Ex1 of LA1; emission spectrum Em1 of LA1 overlaps with excitation spectra Ex1 of LA1 and Ex2 of LA2; emission spectrum Em2 of LA2 overlaps with excitation spectra Ex2 of LA2 and Ex3 of LA3; emission spectrum Em3 overlaps with excitation spectra Ex3 of LA3 and Ex4 of LA4; and emission spectrum Em4 overlaps with excitation spectra Ex3 of LA3 and Ex4 of LA4. As used herein "narrow band source" refers to a source spectrum overlapping with the excitation spectrum of a single species of luminescent agent.

FIG. 6 illustrates that there can be more than one source, for example, 2 sources that each have different source spectra S1 and S2, that overlap with two different excitation spectra. Specifically, FIG. 6 illustrates source spectra S1 and S2 overlapping with the excitation spectra Ex2 and Ex3, respectively, whose corresponding emission spectra overlap with various excitation spectra of various luminescent agents. It is noted that while only two sources are illustrated in FIG. 6, more than 2 sources can be present.

FIG. 7 illustrates that source spectrum S can comprise at least one single, broad band source that overlaps with more than one excitation spectra. Specifically, FIG. 7 illustrates that source spectrum S overlaps with excitation spectra Ex1, Ex2, and Ex3 of luminescent agents LA1, LA2, and LA3, respectively, and various emission spectra overlap with various excitation spectra as in FIG. 5. As used herein "broad band source" refers to a source spectrum overlapping with the excitation spectrum of more than one species of luminescent agent.

When a radiation emitting device is desired that emits white light, three or more luminescent agents can be chosen and applied as in FIGS. 5-7, where emission spectra Em1, Em2, and Em3 can be chosen such that A is blue, B is green, and C is red, respectively, and where LA4 is optional. LA4 can be an upshifting luminescent agent that can serve to cap a series of downshifting luminescent agents, LA1, LA2, and LA3, by recycling photons in the tail of emission spectrum Em3. Further, the wavelength I and wavelength II refer to wavelengths outside of the illustrated spectra in the figures. For example, wavelength I can be the UV band and the wavelength II can be the IR band.

Figure 8:
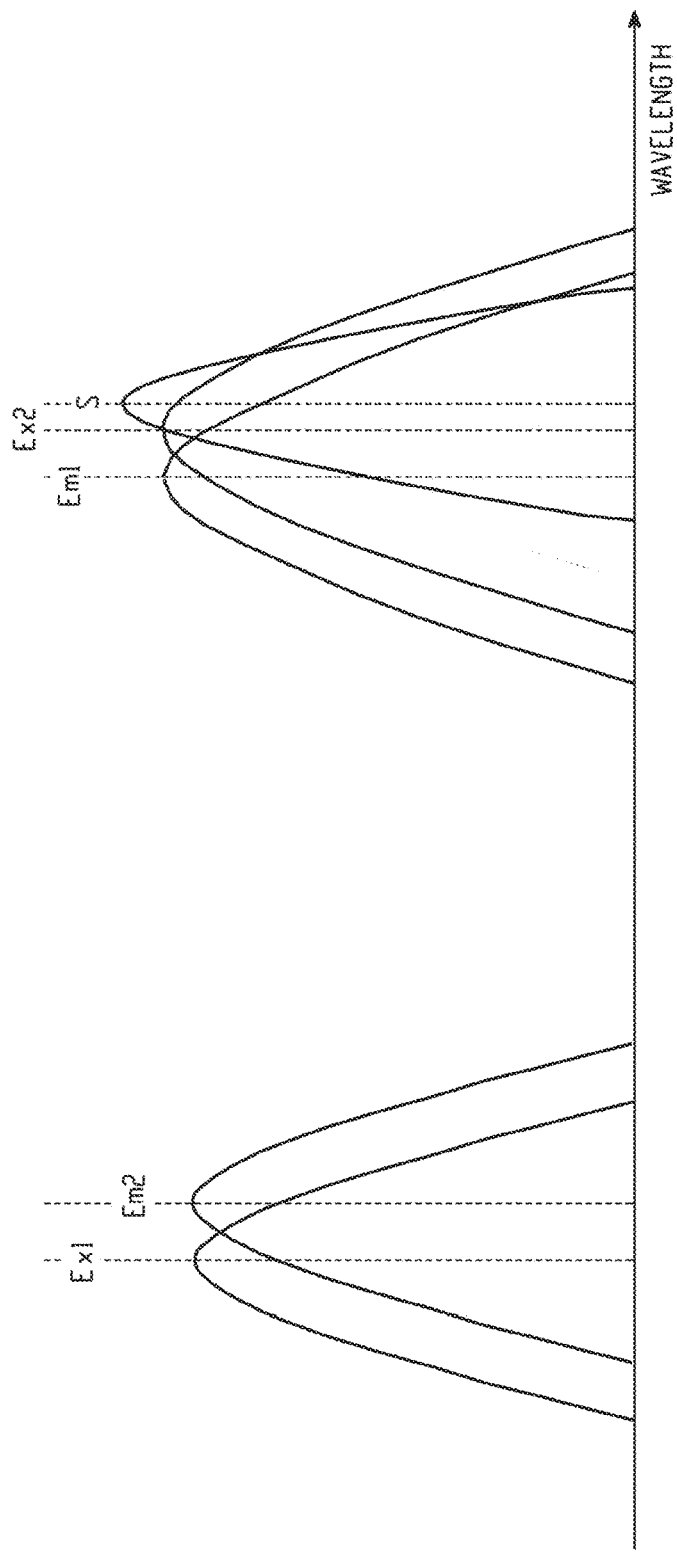
FIG. 8 is a graphical representation of excitation and emission spectra for two luminescent agents where the source spectrum overlaps with the excitation spectrum of an upshifting luminescent agent.

FIG. 8 illustrates that source spectrum S can overlap the excitation spectrum Ex2 of a second luminescent agent. Emission spectrum Em2 can overlap with excitation spectrum Ex1 of a first luminescent agent, which can have an emission spectrum Em1 that can overlap with excitation spectrum Ex2 of the second luminescent agent. Alternatively, S can overlap the excitation spectrum Ex1 of the first luminescent agent of FIG. 8 and the emission spectrum Em1 can overlap with the excitation spectrum Ex2 of the second luminescent agent, which can have the emission spectrum Em2 that can overlap with excitation spectrum Ex1 of the first luminescent agent. In contrast with FIG. 4, excitation spectrum Ex1 and emission spectrum Em1 can be non-overlapping and excitation spectrum Ex2 and emission spectrum Em2 can be non-overlapping (for example, as illustrated in FIG. 8). Whether the source spectrum S overlaps with Ex1 or Ex2, the non-overlapping nature of Ex1 and Em1 and of Ex2 and Em2 can provide recycling of the photons without self-absorption.

It is understood that in FIGS. 3-8, while the peaks are illustrated to be slightly offset from each other, they can be further offset from each other or can coincide with each other. It is likewise understood that, while not illustrated, the source, excitation and emission spectra can have tails that extend further along the x-axis below the illustrated base line. It is further noted that, in the figures, the relative heights of Ex1 and Ex2 can represent the above-described conditions, for example, the relative heights in FIG. 3 represent the condition in Equation 4b, while in FIG. 4 the relative heights represent the condition in Equation 5b.

The luminescent agent can be distributed over the length of the article and can act, not only to shift the photon wavelength, but also to redirect photons. For example, a portion of the first generation photons can be redirected from total internal reflection within the radiation emitting layer into the escape cone so that they can exit the radiation emitting layer and a portion of the first generation photons can excite a further luminescent agent (such as one or both of the first luminescent agent and the second luminescent agent) within the radiation emitting layer.

The luminescent agent can be sized such that it does not reduce the transparency of the radiation emitting layer, for example, the luminescent agent can be one that does not scatter visible light, specifically, light with a wavelength of 390 to 700 nm. The luminescent agent can have a longest average dimension of less than or equal to 300 nm, specifically, less than or equal to 100 nm, more specifically, less than or equal to 40 nm, still more specifically, less than or equal to 35 nm.

The luminescent agent can comprise a downshifting agent (such as $(py)_{24}Nd_{28}F_{68}(SePh)_{16}$, where py is pyridine), an upshifting agent (such as $NaCl:Ti^{2+}$; $MgCl_2:Ti^{2+}$; $Cs_2ZrBr_6$: $Os^{4+}$; and $Cs_2ZrCl_6:Re^{4+}$), or a combination comprising one or both of the foregoing. The upshifting agent can comprise less than or equal to 5 weight percent (wt %) of the Ti, Os, or Re based on the total weight of the agent. The luminescent agent can comprise an organic dye (such as rhodamine 6G), an indacene dye (such as a polyazaindacene dye)), a quantum dot, a rare earth complex, a transition metal ion, or a combination comprising one or more of the foregoing. The luminescent agent can comprise a pyrrolopyrrole cyanine (PPCy) dye. The organic dye molecules can be attached to a polymer backbone or can be dispersed in the radiation emitting layer. The luminescent agent can comprise a pyrazine type compound having a substituted amino and/or cyano group, pteridine compounds such as benzopteridine derivatives, perylene type compounds (such as LUMOGEN™ 083 (commercially available from BASF, NC)), anthraquinone type compounds, thioindigo type compounds, naphthalene type compounds, xanthene type compounds, or a combination comprising one or more of the foregoing. The luminescent agent can comprise pyrrolopyrrole cyanine (PPCy), a bis(PPCy) dye, an acceptor-substituted squaraine, or a combination comprising one or more of the foregoing. The pyrrolopyrrole cyanine can comprise $BF_2$-PPCy, $BPh_2$-PPCy, bis($BF_2$-PPCy), bis($BPh_2$-PPCy), or a combination comprising one or more of the foregoing. The luminescent agent can comprise a lanthanide-based compound such as a lanthanide chelate. The luminescent agent can comprise a chalcogenide-bound lanthanide. The luminescent agent can comprise a transition metal ion such as $NaCl:Ti^{2+}$; $MgCl_2$:

Ti$^{2+}$; or a combination comprising at least one of the foregoing. The luminescent agent can comprise YAlO$_3$:Cr$^{3+}$, Yb$^{3+}$; Y$_3$Ga$_5$O$_{12}$:Cr$^{3+}$,Yb$^{3+}$; or a combination comprising at least one of the foregoing. The luminescent agent can comprise Cs$_2$ZrBr$_6$:Os$^{4+}$; Cs$_2$ZrCl$_6$:Re$^{4+}$; or a combination comprising at least one of the foregoing. The luminescent agent can comprise a combination comprising at least one of the foregoing luminescent agents. The luminescent agent can comprise an LA1 and an LA2, where LA1 can comprise a lanthanide-based compound and LA2 can comprise a transition metal ion such NaCl:Ti$^{2+}$; MgCl$_2$:Ti$^{2+}$; Cs$_2$ZrBr$_6$:Os$^{4+}$; Cs$_2$ZrCl$_6$:Re$^{4+}$; or a combination comprising at least one of the foregoing.

The luminescent agent can have a molar extinction of greater than or equal to 100,000 inverse molar concentration times inverse centimeters (M$^{-1}$ cm$^{-1}$)The luminescent agent can have a molar extinction of greater than or equal to 500,000 M$^{-1}$ cm$^{-1}$.

The luminescent agent can be encapsulated in a surrounding sphere, such as a silica or polystyrene sphere, and the like. The luminescent agent can be free of one or more of lead, cadmium, and mercury. The luminescent agent can have a quantum yield of 0.1 to 0.95. The luminescent agent can have a quantum yield of 0.2 to 0.75.

The luminescent agent can absorb radiation over a first range of wavelengths and can re-emit radiation over a second range of wavelengths that can partially overlap with the first range or that does not overlap with the first range. The radiation that can be absorbed by the luminescent agent can originate from the radiation source and/or from the same species of luminescent agent and/or from a different species of luminescent agent.

Emission from the luminescent agent can be directionally isotropic, where emitted photons either exit the device through an escape cone or are confined to the article by total internal reflection. The direction of the radiation exiting through the escape cone can be uniformly distributed over a wide angular range centered on the direction perpendicular to the broad surfaces of the device.

Excitation and emission for the luminescent agent can be anisotropic (also referred to as dichroic) such that excitation and emission can be favored in directions perpendicular to a long axis of the luminescent agent. The long axis can be perpendicular to the broad surface, or at least within, for example, 10 degrees of normal. Alternatively, alignment of the long axis can vary at various locations. For example, the long axis of an anisotropic luminescent agent towards a center of one of the broad surfaces can be at an angle of, for example, 10 degrees to 90 degrees from the normal to the surface and the long axis of the anisotropic luminescent agent towards an edge of the radiation emitting device can be within 10 degrees of normal with respect to the broad surface.

The emitted radiation can have a wavelength ranging from that of UV radiation to near IR radiation. The emitted radiation can have a wavelength of 10 nm to 2.5 micrometers. Emissions in the UV and/or near IR wavelength range can be useful in applications such as defogging, defrosting, and deicing as water and ice have absorption coefficients that practically coincide over wavelengths ranging from the UV to the near IR, exhibiting respective minima in the visible wavelength range and increasing rapidly away from these minima.

The radiation emitting layer can comprise a UV absorber, in particular UV absorbing additives, also referred to as UV stabilizers, include hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis(4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Cytec) or combinations comprising at least one of the foregoing light stabilizers. The UV stabilizers can be present in an amount of 0.01 to 1 wt % based upon the total weight of polymer in the composition. The UV stabilizers can be present in an amount of 0.1 to 0.5 wt % based upon the total weight of polymer in the composition. The UV stabilizers can be present in an amount of 0.15 to 0.4 wt % based upon the total weight of polymer in the composition.

The radiation source can be an edge mounted light source as is illustrated in FIGS. 1 and 2 Likewise, the radiation source can be remote from the article and coupled to at least one edge of the device by, for example, an optical fiber. When a remote radiation source is used, the radiation source can be used in conjunction with one or more devices.

The coupling of the radiation source to the radiation emitting device can be optically continuous and can be configured to emit radiation within the acceptance cone at the edge of the radiation emitting device so that the radiation can be guided through the device by total internal reflection. As used herein, the term "optically continuous" can mean that 90 to 100% of the light from the radiation source is transmitted into the radiation emitting device. The radiation source can be coupled to the edge the radiation emitting device having a surface as defined by the height d and a width that is not illustrated in the FIG. 1.

The radiation source can be a radiation source that emits 40 to 400 Watts per meter as measured along the edge to which the source is coupled (W/m). The radiation source can be a radiation source that emits 70 to 300 W/m. The radiation source can be a radiation source that emits 85 to 200 W/m.

The radiation source can emit radiation with a wavelength of 100 to 2,500 nm. The radiation source can emit radiation with a wavelength of 300 to 1,500 nm. The radiation source can emit radiation in the visible range with a wavelength of 380 to 750 nm. The radiation source can emit near infrared radiation with a wavelength of 700 to 1,200 nm. The radiation source can emit near infrared radiation with a wavelength of 800 to 1,100 nm. The radiation source can emit UV radiation with a wavelength of 250 to 400 nm. The radiation source can emit UV radiation with a wavelength of 350 to 400 nm. The emitted radiation from the radiation source can be filtered to a desired wavelength before being introduced to the radiation emitting layer.

The radiation source can be, for example, a light-emitting diode (LED), a tungsten filament bulb; an ultraviolet light; a fluorescent lamp (such as one that emits white, pink, black, blue, or black light blue (BLB) light); an incandescent lamp; a high intensity discharge lamp (such as a metal halide lamp); a cold-cathode tube, fiber optical waveguides; organic light-emitting diodes (OLED); or devices generating electro-luminescence (EL).

The radiation emitting device can optionally have a mirror located on one or more sides of the device in order to increase the efficiency of the radiation emitting device by reflecting photons that otherwise might exit the device. The mirror can be highly reflective, such as in the near-IR range, and can be a metallization of a side. Specifically, the radiation emitting device can comprise one or more of an edge mirror, a selectively reflecting edge mirror, and a surface mirror. The edge mirror can be located on an edge to redirect radiation that would have otherwise escaped from the device back into the radiation emitting layer. The selectively reflecting edge mirror can be located on an edge between the radiation source and the radiation emitting layer, such that the source spectrum is largely transmitted between the radiation source and the device while the emission spectra of the luminescent agent can be largely reflected back into the radiation emitting layer. When emission is desired from only one of the two broad surfaces, a surface mirror can be located on one of the surfaces of the radiation emitting layer or can be located proximal to said surface such that there is a gap located there between. The gap can comprise a liquid (such as water, oil, a silicon fluid, or the like), a solid that has a lower refractive index than the radiation emitting layer, or a gas (such as air, oxygen, nitrogen, or the like). The gap can comprise a liquid or gas that has a lower RI than the radiation emitting layer. The gap can be an air gap to support total internal reflection within the device.

The radiation emitting device can comprise a protective coating layer, where the coating can be applied to one or both of the broad surfaces. The protective coating can be applied to a broad surface of a photo-catalytic layer. The protective coating layer can comprise a UV protective layer, an abrasion resistant layer, an anti-fog layer, or a combination comprising one or more of the foregoing. The protective coating layer can comprise a silicone hardcoat.

A UV protective layer can be applied to an external surface of the device. For example, the UV protective layer can be a coating having a thickness of less than or equal to 100 micrometers (μm). The UV protective layer can be a coating having a thickness of 4 μm to 65 μm. The UV protective layer can be applied by various means, including dipping the plastic substrate in a coating solution at room temperature and atmospheric pressure (i.e., dip coating). The UV protective layer can also be applied by other methods including, but not limited to, flow coating, curtain coating, and spray coating. The UV protective layer can include silicones (e.g., a silicone hard coat), polyurethanes (e.g., polyurethane acrylate), acrylics, polyacrylate (e.g., polymethacrylate, polymethylmethacrylate), polyvinylidene fluoride, polyesters, epoxies, and combinations comprising at least one of the foregoing. The UV protective layer can comprise a UV blocking polymer, such as poly(methyl methacrylate), polyurethane, or a combination comprising one or both of the foregoing. The UV protective layer can comprise a UV absorbing molecule. The UV protective layer can include a silicone hard coat layer (for example, AS4000, AS4700, or PHC587, commercially available from Momentive Performance Materials).

The UV protective layer can include a primer layer and a coating (e.g., a top coat). A primer layer can aid in adhesion of the UV protective layer to the device. The primer layer can include, but is not limited to, acrylics, polyesters, epoxies, and combinations comprising at least one of the foregoing. The primer layer can also include ultraviolet absorbers in addition to or in place of those in the top coat of the UV protective layer. For example, the primer layer can include an acrylic primer (for example, SHP401 or SHP470, commercially available from Momentive Performance Materials).

An abrasion resistant layer (e.g., a coating or plasma coating) can be applied to one or more surfaces of the device. Specifically, an abrasion resistant layer can be applied to a UV protective layer. The abrasion resistant layer can include a single layer or a multitude of layers and can add enhanced functionality by improving abrasion resistance of the radiation emitting device. Generally, the abrasion resistant layer can include an organic coating and/or an inorganic coating such as, but not limited to, aluminum oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon carbide, silicon oxy carbide, hydrogenated silicon oxy-carbide, tantalum oxide, titanium oxide, tin oxide, indium tin oxide, yttrium oxide, zinc oxide, zinc selenide, zinc sulfide, zirconium oxide, zirconium titanate, glass, and combinations comprising at least one of the foregoing.

The abrasion resistant layer can be applied by various deposition techniques such as vacuum assisted deposition processes and atmospheric coating processes. For example, vacuum assisted deposition processes can include, but are not limited to, plasma enhanced chemical vapor deposition (PECVD), arc-PECVD, expanding thermal plasma PECVD, ion assisted plasma deposition, magnetron sputtering, electron beam evaporation, and ion beam sputtering.

Optionally, one or more of the layers (e.g., UV protective layer and/or abrasion resistant layer and/or an anti-fog layer) can be a film applied to an external surface of the radiation emitting device by a method such as lamination or film insert molding. In this case, the functional layer(s) or coating(s) could be applied to the film and/or to the side of the radiation emitting device opposite the side with the film. For example, a co-extruded film, an extrusion coated, a roller-coated, or an extrusion-laminated film comprising greater than one layer can be used as an alternative to a hard coat (e.g., a silicone hard coat) as previously described. The film can contain an additive or copolymer to promote adhesion of the UV protective layer (i.e., the film) to an abrasion resistant layer, and/or can itself include a weatherable material such as an acrylic (e.g., polymethylmethacrylates), fluoropolymer (e.g., polyvinylidene fluoride, polyvinyl fluoride), etc., and/or can block transmission of ultraviolet radiation sufficiently to protect the underlying substrate; and/or can be suitable for film insert molding (FIM) (in-mold decoration (IMD)), extrusion, or lamination processing of a three dimensional shaped panel.

The UV absorbing molecule can comprise a hydroxybenzophenone (e.g., 2-hydroxy-4-n-octoxy benzophenone), a hydroxybenzotriazine, a cyanoacrylate, an oxanilide, a benzoxazinone (e.g., 2,2'-(1,4- phenylene)bis(4H-3,1-benzoxazin-4-one, commercially available under the trade name CYASORB UV-3638 from Cytec), an aryl salicylate, a hydroxybenzotriazole (e.g., 2-(2-hydroxy-5-methylphenyl) benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Cytec), or a combination comprising at least one of the foregoing. The UV absorbing molecule can comprise a hydroxyphenylthazine, a hydroxybenzophenone, a hydroxylphenylbenzothazole, a hydroxyphenyltriazine, a polyaroylresorcinol, a cyanoacrylate, or a combination comprising at least one of the foregoing. The UV absorbing molecule can be present in an amount of 0.01 to 1 wt %, specifically, 0.1 to 0.5 wt %, and more specifically, 0.15 to 0.4 wt %, based upon the total weight of polymer in the composition.

One or more of the layers can each independently include an additive. The additive can include colorant(s), antioxidant(s), surfactant(s), plasticizer(s), infrared radiation absorber(s), antistatic agent(s), antibacterial(s), flow additive(s), dispersant(s), UV absorbing molecule(s), compatibilizer(s), cure catalyst(s), and combinations comprising at least one of the foregoing. The type and amounts of any additives added to the various layers depends on the desired performance and end use of the radiation emitting device.

The protective coating(s) can be selected such that it does not absorb in the near-IR range and/or such that it has a lower refractive index than the radiation emitting layer.

The radiation emitting device can comprise a photo-catalytic layer that can comprise a photo-catalytic agent. The photo-catalytic agent, when exposed to near-UV radiation in the presence of water can generate (OH) radicals and/or superoxide ions ($O_2^-$), which can promote degradation of organic surface contaminants. The degraded contaminants can then be removed by rinsing with water.

The photo-catalytic agent can comprise titanium dioxide (such as the anatase, brookite, and rutile forms of titanium dioxide), zinc oxide, tin oxide, iron oxide, zirconium oxide, tungsten oxide (such as $W_2O_3$, $WO_2$, and $WO_3$), chromium oxide, molybdenum oxide, ruthenium oxide, germanium oxide, lead oxide, cadmium oxide, copper oxide, vanadium oxide, niobium oxide, tantalum oxide, manganese oxide, rhodium oxide, nickel oxide, rhenium oxide, cadmium sulfide, strontium tintanate, molybdenum disulfide, or a combination comprising one or more of the foregoing. The photo-catalytic agent can be coated with a coating comprising, for example, a silica, a metal (such as copper, silver, zinc, lead, ruthenium, rhodium, iridium, osmium, or platinum), or a combination comprising one or more of the foregoing. The photo-catalytic agent can have an average longest dimension based on the average of the longest dimensions of all of the photo-catalytic agents of 5 to 300 nm, specifically, 5 to 50 nm.

The photo-catalytic layer can comprise 1 to 60 wt %, specifically, 1 to 20 wt % of a photo-catalytic agent based on the total weight of the photo-catalytic layer. The photo-catalytic layer can have a thickness of 0.1 to 10 micrometers.

Total internal reflection can be difficult to achieve in devices comprising a photo-catalytic layer due to the high refractive index of compounds in photo-catalytic layers comprising, for example, $TiO_2$, which, in its solid, anatase form has a refractive index of 2.6. In order to overcome these challenges, the radiation emitting device can comprise one or more of an increased porosity, for example, in the photo-catalytic layer, a plurality of a low refractive index nanoparticles located in the photo-catalytic layer, and an interlayer that has a lower refractive index than the radiation emitting layer located in between the photo-catalytic layer and the radiation emitting layer. The increased porosity can arise from void spaces present in the photo-catalytic layer. The void spaces can arise from a porous photo-catalytic agent, the presence of voids located in between photo-catalytic agents, a porosity in a host material, void agents, or a combination comprising one or more of the foregoing. The porous photo-catalytic agent can comprise a void space, where, for example, 30 to 60 volume percent (vol %), specifically, 40 to 50 vol % of the porous photo-catalytic agent can be void space. The void agent can comprise spherically encapsulated voids, for example, the void agent can comprise glass microspheres (such as those made of an alkali borosilicate glass). The void agent can have a mean diameter of less than or equal to 300 nm, specifically, 15 to 200 nm, more specifically, 20 to 70 nm. The void space can comprise air. The plurality of low refractive index nanoparticles can have a refractive index of less than that of the photo-catalytic agent, for example, less than 2.6, specifically, less than or equal to 2, more specifically, 0.5 to 1.8 as determined at a wavelength of 300 nanometers (nm). The plurality of low refractive index nanoparticles can have an average diameter of 1 to 30 nm, specifically, 2 to 10 nm. The plurality of low refractive index nanoparticles can comprise gold nanoparticles, for example, $AuCl_4H$ nanoparticles.

The interlayer can have a refractive index that is less than that of the host material of the radiation emitting layer to support total internal reflection in the radiation emitting layer. The interlayer can further act as a barrier layer to help to reduce or prevent radicals generated in the photo-catalytic layer from penetrating into the radiation emitting layer. The interlayer can comprise a UV absorber.

The radiation emitting device can be a flat panel, a glazing, or a lens for lighting modules. The radiation emitting device can be used for one or more of defogging, defrosting, and deicing, specifically in applications such as exterior lighting, for example, automotive exterior lighting (headlights and tail lights), air field lights, street lights, traffic lights, and signal lights; glazings, for example, for transportation (automotive) or construction applications (skylights); appliances, for example, for defrosting interior walls of a freezer compartment; and signage.

The radiation emitting device can be used for visible illumination where the emission band can be broad (for example, emitting white light) or can be narrow (for example, emitting a colored light). Applications include, for example, shelving (such as refrigerator shelves, product display cases, furniture cabinetry, and utility shelves); ambient interior lighting (such as in transportation vehicles or in buildings); signage (such as backlighting of signs); and photosynthesis applications (such as plant growth for pharmaceutical or cosmetic use). For photosynthesis applications, the emission wavelengths can be 600 to 800 nm.

The radiation emitting device can be used for photo-catalysis, specifically for use in the degradation of organic compounds for self-cleaning purposes. For photo-catalytic applications, the emission wavelengths can be near-UV, for example, 350 to 400 nm, to avoid shorter wavelengths that can act to degrade the host material.

Set forth below are some embodiments of the present radiation emitting device and method of emitting radiation therefrom.

Embodiment 1: A radiation emitting device comprising: a radiation emitting layer comprising a host material and a luminescent agent; and a radiation source that emits a source radiation; wherein the radiation emitting layer comprises an edge and two broad surfaces, wherein the edge has a height of d and the broad surfaces have a length L, wherein length L is greater than height d, and the ratio of the length L to the height d is greater than or equal to 10; and wherein the radiation source is coupled to the edge, wherein the source radiation is transmitted from the radiation source through the edge and excites the luminescent agent, whereafter the luminescent agent emits an emitted radiation, wherein at least a portion of the emitted radiation exits through at least one of the broad surfaces through an escape cone.

Embodiment 2: The device of Embodiment 1, wherein the radiation emitted from one or both of the broad surfaces is uniform such that the measured radiation at all locations on a broad surface is within 40%, specifically, 30%, more specifically, 20% of the average radiation being emitted from the broad surface.

Embodiment 3: The device of any of the preceding Embodiments, further comprising one or more of an edge mirror, a selectively reflecting edge mirror, and a surface mirror.

Embodiment 4: The device of any of the preceding Embodiments, wherein the radiation emitting layer comprises an in-mold coating layer.

Embodiment 5: The device of Embodiment 4, wherein the luminescent agent is located in the in-mold coating layer.

Embodiment 6: The device of any of the preceding Embodiments, wherein the radiation emitting layer comprises polycarbonate, polyester, polyacrylate, or a combination comprising one or more of the foregoing.

Embodiment 7: The device of Embodiment 6, wherein the polyester comprises polyethylene terephthalate and the polyacrylate comprises a polyalkylmethacrylate such as polymethylmethacrylate.

Embodiment 8: The device of any of the preceding Embodiments, wherein the luminescent agent comprises a dye, a quantum dot, a rare earth complex, a transition metal ion, or a combination comprising one or more of the foregoing.

Embodiment 9: The device of any of the preceding Embodiments, wherein the luminescent agent comprises $(py)_{24}Nd_{28}F_{68}(SePh)_{16}$; $NaCl:Ti^{2+}$; $MgCl_2:Ti^{2+}$; $Cs_2ZrBr_6:Os^{4+}$; $Cs_2ZrCl_6:Re^{4+}$; $YAlO_3:Cr^{3+},Yb^{3+}$; $Y_3Ga_5O_{12}:Cr^{3+},Yb^{3+}$; rhodamine 6G; an indacene dye; a pyrazine type compound having one or both of a substituted amino group and a cyano group; a pteridine compound; a perylene type compound; an anthraquinone type compound; a thioindigo type compound; a naphthalene type compound; a xanthene type compound; a pyrrolopyrrole cyanine (PPCy); a bis (PPCy) dye; an acceptor-substituted squaraine; a lanthanide-based compound; or a combination comprising one or more of the foregoing.

Embodiment 10: The device of any of the preceding Embodiments, wherein the luminescent agent comprises an LA1 and an LA2, where LA1 can comprise a lanthanide-based compound and LA2 can comprise a transition metal ion such as $NaCl:Ti^{2+}$; $MgCl_2:Ti^{2+}$; $Cs_2ZrBr_6:Os^{4+}$; $Cs_2ZrCl_6:Re^{4+}$; $YAlO_3:Cr^{3+},Yb^{3+}$; $Y_3Ga_5O_{12}:Cr^{3+},Yb^{3+}$; or a combination comprising at least one of the foregoing.

Embodiment 11: The device of any of the preceding Embodiments, further comprising a protective coating, wherein the protective coating comprises a UV protective layer, an abrasion resistant layer, an anti-fog layer, or a combination comprising one or more of the foregoing.

Embodiment 12: The device of any of the preceding Embodiments, wherein the emitted radiation comprises radiation with a wavelength in the UV range, the visible range, the near IR range, or a combination comprising one or more of the foregoing.

Embodiment 13: The device of any of the preceding Embodiments, wherein the emitted radiation is broad band emission or narrow band emission.

Embodiment 14: The device of any of the preceding Embodiments, wherein the device further comprises a photo-catalytic layer.

Embodiment 15: The device of Embodiment 14, further comprising one or more of a void space in the photo-catalytic layer, a plurality of low refractive index nanoparticles located in the photo-catalytic layer, and an interlayer located in between the photo-catalytic layer and the radiation emitting layer.

Embodiment 16: The device of Embodiment 15, wherein the interlayer has a lower refractive index than the radiation emitting layer.

Embodiment 17: The device of any of Embodiments 15-16, wherein void space arises from a porous photo-catalytic agent comprising 30 to 60 vol % of a void space.

Embodiment 18: The device of any of Embodiments 15-17, wherein the plurality of low refractive index nanoparticles has a refractive index of less than 2.6 or less than or equal to 2, or 0.5 to 1.8 as determined at a wavelength of 300 nanometers.

Embodiment 19: The device of any of Embodiments 15-18, wherein the plurality of low refractive index nanoparticles has an average diameter of 1 to 30 nm.

Embodiment 20: The device of any of Embodiments 15-19, wherein the plurality of low refractive index nanoparticles comprises gold nanoparticles.

Embodiment 21: The device of any of the preceding Embodiments, wherein the luminescent agent comprises two or more luminescent agents.

Embodiment 22: The device of Embodiment 21, wherein the luminescent agent comprises two luminescent agents, wherein one luminescent agent is an upshifting luminescent agent and the other luminescent agent is a downshifting luminescent agent.

Embodiment 23: The device of Embodiment 21, wherein the luminescent agent comprises a first, a second, and a third luminescent agent, wherein the first, the second, and the third luminescent agent are downshifting luminescent agents.

Embodiment 24: The device of Embodiment 23, further comprising a fourth luminescent agent, wherein the fourth luminescent agent is an upshifting luminescent agent.

Embodiment 25: The device of any of the preceding Embodiments, wherein the radiation emitting layer is transparent.

Embodiment 26: The device of any of the preceding Embodiments, wherein the ratio of the length L to the height d is greater than or equal to 30.

Embodiment 27: A method for emitting radiation from any of the devices of the preceding Embodiments comprising emitting radiation from the surface comprising: emitting the source radiation from the radiation source; illuminating the radiation emitting layer comprising the host material and the luminescent agent with the radiation, wherein the radiation emitting layer comprises the edge, the first broad surface, and the second broad surface; wherein the radiation source is coupled to the edge, wherein the source radiation is transmitted from the radiation source through the edge and excites the luminescent agent, whereafter the luminescent agent emits an emitted radiation, wherein at least a portion of the emitted radiation exits through at least one of the broad surfaces through an escape cone.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants, or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more specifically, 5 wt % to 20 wt %," is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to Applicants or others skilled in the art. Accordingly, the appended claims as filed and as they may be amended are intended to embrace all such alternatives, modifications variations, improvements, and substantial equivalents.

This application claims the benefit of U.S. Provisional Patent Application Ser. No. 62/084,061 filed Nov. 25, 2014. The related application is incorporated herein by reference.

The invention claimed is:

1. A radiation emitting device comprising:
a radiation emitting layer comprising a host material and a luminescent agent; wherein the luminescent agent comprises two luminescent agents, wherein one luminescent agent is an upshifting luminescent agent and the other luminescent agent is a downshifting luminescent agent; and
a radiation source that emits a source radiation;
wherein the radiation emitting layer comprises an edge and two broad surfaces, wherein the edge has a height of d and the broad surfaces have a length L, wherein length L is greater than height d, and the ratio of the length L to the height d is greater than or equal to 10; and
wherein the radiation source is coupled to the edge, wherein the source radiation is transmitted from the radiation source through the edge and excites the luminescent agent, whereafter the luminescent agent emits an emitted radiation, wherein at least a portion of the emitted radiation exits through at least one of the broad surfaces through an escape cone;
wherein one of
an emission spectrum Em1 of the downshifting luminescent agent overlaps with an excitation spectrum Ex1 of the downshifting luminescent agent and with an excitation spectrum Ex2 of the upshifting luminescent agent; wherein an emission spectrum Em2 of the upshifting luminescent agent overlaps with the emission spectrum Em1; and wherein a source spectrum of the radiation source overlaps with one of the excitation spectrum Ex2 or the excitation spectrum Ex1; or
the excitation spectrum Ex1 of the downshifting luminescent agent overlaps with the emission spectrum Em2 of the upshifting luminescent agent; wherein the excitation spectrum Ex2 of the upshifting luminescent agent overlaps with the emission spectrum Em1 of the downshifting luminescent agent; and wherein the source spectrum of the radiation source overlaps with one of the excitation spectrum Ex2 or excitation spectrum Ex1.

2. The device of claim 1, wherein the radiation emitted from one or both of the broad surfaces is uniform such that the measured radiation at all locations on a broad surface is within 40% of the average radiation being emitted from the broad surface.

3. The device of claim 1, further comprising one or more of an edge mirror, a selectively reflecting edge mirror, and a surface mirror.

4. The device of claim 1, wherein the radiation emitting layer comprises an in-mold coating layer.

5. The device of claim 4, wherein the luminescent agent is located in the in-mold coating layer.

6. The device of claim 1, wherein the host material comprises polycarbonate, polyester, polyacrylate, or a combination comprising one or more of the foregoing.

7. The device of claim 1, wherein the luminescent agent comprises a dye, a quantum dot, a rare earth complex, a transition metal ion, or a combination comprising one or more of the foregoing.

8. The device of claim 1, further comprising a UV protective layer, an abrasion resistant layer, an anti-fog layer, or a combination comprising one or more of the foregoing.

9. The device of claim 1, wherein the emitted radiation comprises radiation with a wavelength in the UV range, the visible range, the near IR range, or a combination comprising one or more of the foregoing.

10. The device of claim 1, wherein the device further comprises a photo-catalytic layer.

11. The device of claim 1, wherein the luminescent agent comprises a third luminescent agent, wherein the third luminescent agent is optionally a downshifting luminescent agent.

12. The device of claim 11, further comprising a fourth luminescent agent, wherein the fourth luminescent agent is an upshifting luminescent agent.

13. The device of claim 1, wherein the radiation emitting layer is transparent.

14. The device of claim 1, wherein the ratio of the length L to the height d is greater than or equal to 30.

15. The device of claim 1, wherein the luminescent agent comprises $(py)_{24}Nd_{28}F_{68}(SePh)_{16}$; $NaCl:Ti^{2+}$; $MgCl_2:Ti^{2+}$; $Cs_2ZrBr_6:Os^{4+}$; $Cs_2ZrCl_6:Re^{4+}$; $YAlO_3:Cr^{3+},Yb^{3+}$; $Y_3Ga_5O_{12}:Cr^{3+},Yb^{3+}$; rhodamine 6G; an indacene dye; a pyrazine type compound having one or both of a substituted amino group and a cyano group; a pteridine compound; a perylene type compound; an anthraquinone type compound; a thioindigo type compound; a naphthalene type compound; a xanthene type compound; a pyrrolopyrrole cyanine (PPCy); a bis(PPCy) dye; an acceptor-substituted squaraine; a lanthanide-based compound; or a combination comprising one or more of the foregoing.

16. The device of claim 1, wherein the device has a transmission of greater than or equal to 80%, wherein transmission is determined by using 3.2 mm thick samples using ASTM D1003-00, Procedure B using CIE standard illuminant C, with unidirectional viewing.

17. The device of claim 1, wherein the device is flat panel, a glazing, or a lens for a lighting module.

18. A method for emitting radiation from a surface comprising:
emitting a source radiation from a radiation source;
illuminating a radiation emitting layer comprising a host material and a luminescent agent with the radiation, wherein the radiation emitting layer comprises an edge, a first broad surface, and a second broad surface, wherein the edge has a height of d and the broad surfaces have a length L, wherein length L is greater than height d, and the ratio of the length L to the height d is greater than or equal to 10;

wherein the luminescent agent comprises two luminescent agents, wherein one luminescent agent is an upshifting luminescent agent and the other luminescent agent is a downshifting luminescent agent; and wherein the radiation source is coupled to the edge, wherein the source radiation is transmitted from the radiation source through the edge and excites the luminescent agent, whereafter the luminescent agent emits an emitted radiation, wherein at least a portion of the emitted radiation exits through at least one of the broad surfaces through an escape cone;

wherein one of an emission spectrum Em1 of the downshifting luminescent agent overlaps with an excitation spectrum Ex1 of the downshifting luminescent agent and with an excitation spectrum Ex2 of the upshifting luminescent agent; wherein an emission spectrum Em2 of the upshifting luminescent agent overlaps with the emission spectrum Em1; and wherein a source spectrum of the radiation source overlaps with one of the excitation spectrum Ex2 or the excitation spectrum Ex1; or the excitation spectrum Ex1 of the downshifting luminescent agent overlaps with the emission spectrum Em2 of the upshifting luminescent agent; wherein the excitation spectrum Ex2 of the upshifting luminescent agent overlaps with the emission spectrum Em1 of the downshifting luminescent agent; and wherein the source spectrum of the radiation source overlaps with one of the excitation spectrum Ex2 or excitation spectrum Ex1.

\* \* \* \* \*